(12) United States Patent
Kapahi

(10) Patent No.: US 9,495,063 B2
(45) Date of Patent: Nov. 15, 2016

(54) DISPLAYING TOOLTIPS TO USERS OF TOUCH SCREENS

(71) Applicant: Oracle International Corporation, Redwood Shores, CA (US)

(72) Inventor: Puneet Kapahi, New Delhi (IN)

(73) Assignee: Oracle International Corporation, Redwood Shores, CA (US)

( * ) Notice: Subject to any disclaimer, the term of this patent is extended or adjusted under 35 U.S.C. 154(b) by 362 days.

(21) Appl. No.: 14/097,259

(22) Filed: Dec. 5, 2013

(65) Prior Publication Data

US 2014/0380158 A1 Dec. 25, 2014

(30) Foreign Application Priority Data

Jun. 24, 2013 (IN) .......................... 2757/CHE/2013

(51) Int. Cl.
 *G06F 3/0481* (2013.01)
 *G06F 3/0488* (2013.01)
(52) U.S. Cl.
 CPC .......... *G06F 3/0481* (2013.01); *G06F 3/0488* (2013.01)
(58) Field of Classification Search
 CPC ........................... G06F 3/0481; G06F 3/0488
 See application file for complete search history.

(56) References Cited

U.S. PATENT DOCUMENTS

| | | | | |
|---|---|---|---|---|
| 5,995,101 A | * | 11/1999 | Clark | G06F 3/04895 715/711 |
| 8,315,938 B1 | * | 11/2012 | Forsythe | G06Q 40/00 705/35 |
| 2004/0135782 A1 | * | 7/2004 | Marais | G06T 11/206 345/440 |
| 2009/0006956 A1 | * | 1/2009 | Bae | G06F 3/0481 715/708 |
| 2010/0251151 A1 | * | 9/2010 | Alsbury | G06F 1/1626 715/765 |
| 2012/0272186 A1 | * | 10/2012 | Kraut | G06F 3/0488 715/810 |
| 2013/0187948 A1 | * | 7/2013 | Yoshimoto | G06F 3/04883 345/629 |
| 2014/0026088 A1 | * | 1/2014 | Monte | G01C 21/3682 715/765 |
| 2014/0082536 A1 | * | 3/2014 | Costa | G06F 3/0488 715/765 |

* cited by examiner

*Primary Examiner* — Anil Bhargava
(74) *Attorney, Agent, or Firm* — IPHORIZONS PLLC; Narendra Reddy Thappeta

(57) ABSTRACT

An aspect of the present disclosure facilitates display of tooltips to users of touch screens. In an embodiment, a user selects an element to cause a message to be displayed as a tooltip associated with the selected element. The display of the tooltip message is persisted (continued) without requiring the user to continue to touch the selected element. According to another aspect of the present disclosure, a user drags (i.e., does not lift finger) a tool-tip element displaying the message. The tool-tip element is updated with message associated with a next display element selected based on the drag operation. The next element can be selected based on any of characteristics of the drag operation (e.g., direction, distance, speed of drag) according to any suitable heuristics suitable in the corresponding environment.

17 Claims, 9 Drawing Sheets

DISPLAYING TOOLTIPS TO USERS OF TOUCH SCREENS

PRIORITY CLAIM

The instant patent application is related to and claims priority from co-pending India Patent Application entitled, "Displaying Tooltips To Users Of Touch Screens", Application Serial Number: 2757/CHE/2013, filed on: Jun. 24$^{th}$ 2013, naming as inventor: Puneet Kapahi, and is incorporated in its entirety herewith.

RELATED APPLICATIONS

1. Entitled, "Supporting Navigation On Touch Screens Displaying Elements Organized In A Fixed Number Of Dimensions", Application Number: 14097263, filed on: 05-DEC-2013,First Named Inventor: Puneet Kapahi;

2. Entitled, "Facilitating Touch Screen Users To Select Elements In A Densely Populated Display", Application Number: 14097260, filed on: 05-DEC-2013,First Named Inventor: Puneet Kapahi;

3. Entitled, "Facilitating Touch Screen Users To Select Elements Identified In A Two Dimensional Space", Application Number: 14097261, filed on: 05-DEC-2013,First Named Inventor: Puneet Kapahi; and 4. Entitled, "Displaying Interactive Charts on Devices With Limited Resources", Application Number: 14097262, filed on: 05-DEC-2013,First Named Inventor: Puneet Kapahi.

BACKGROUND OF THE DISCLOSURE

1. Technical Field

The present disclosure relates to touch screen based systems, and more specifically to displaying tooltips to users of touch screens.

2. Related Art

Tooltips are often employed in conjunction with elements displayed on a display screen. A tooltip normally provides additional information on an element, upon selection of the element.

There is a general need to display tooltips to users of touch screens as well. A touch screen responds to touch operations (e.g., touch/tap, drag, swipe, pinch) of users using one or more of fingers, stylus, etc., and facilitates user interfaces with applications based on the operations.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure facilitates display of tooltips to users of touch screens. In an embodiment, a user selects an element to cause a message to be displayed as a tooltip associated with the selected element. The display of the tooltip message is persisted (continued) without requiring the user to continue to touch the selected element.

According to another aspect of the present disclosure, a user drags (i.e., does not lift finger) a tool-tip element displaying the tooltip message. The tool-tip element is updated with information on a next display element selected based on the drag operation. The next element can be selected based on any of characteristics of the drag operation (e.g., direction, distance, speed of drag) according to any suitable heuristics suitable in the corresponding environment.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1A:
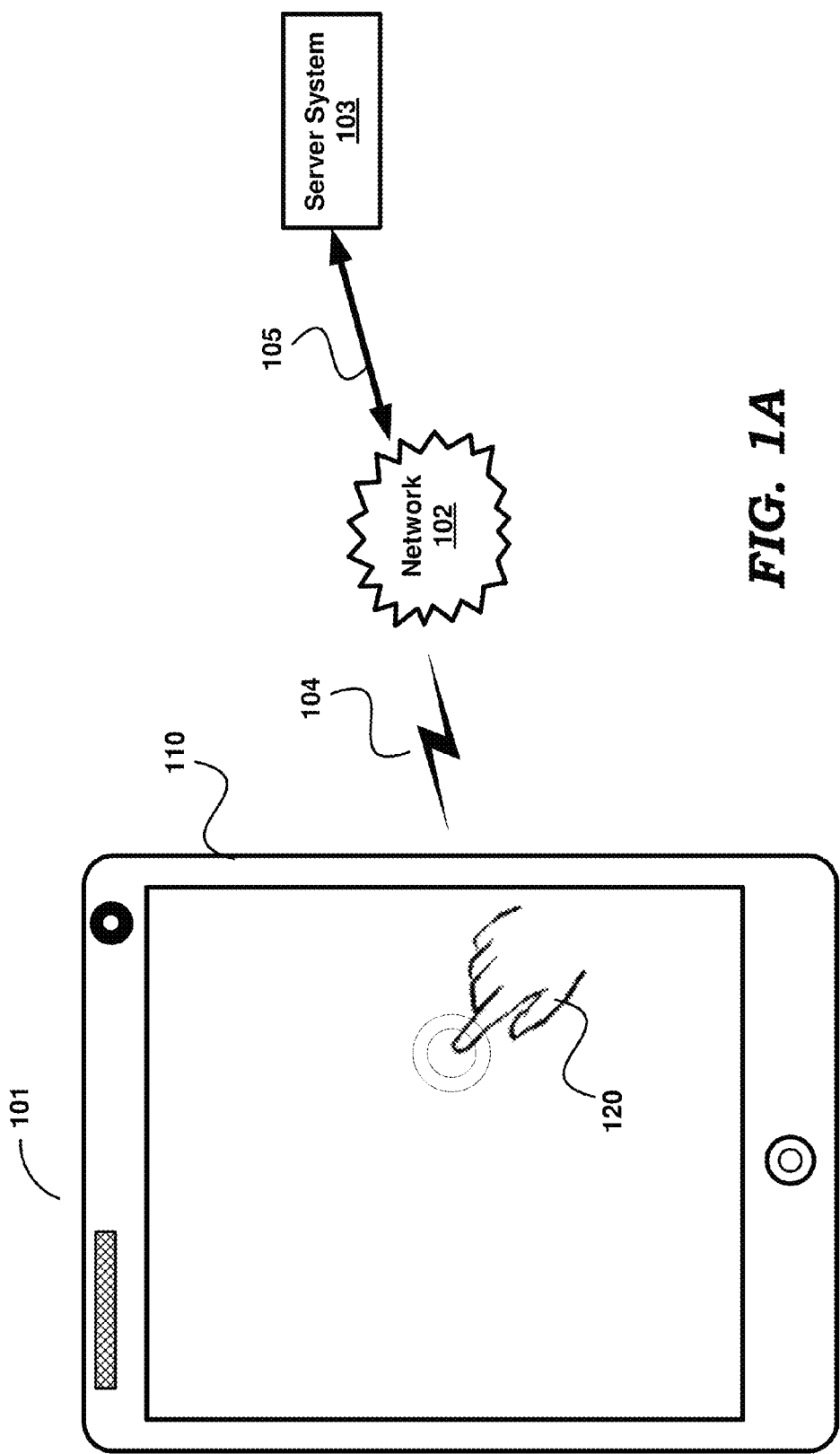
FIG. 1A is a block diagram illustrating an example computing system in which several aspects of the present disclosure can be implemented.

FIG. 1A is a block diagram illustrating the details of an example environment in which several features of the present disclosure can be implemented. The environment is shown containing touch system 101, network 102, and server system 103. Each block is described below in further detail.

Network 102 provides connectivity between touch system 101 and server system 103. Merely for illustration, touch system is shown communicating over wireless path 104, and server system 103 using a wire-based path 105. However, each system 101/103 can have the ability to communicate based on wireless and/or wire-based paths.

Server system 103 implements various applications, that form the basis for interaction with touch system 101. Server system 103 may send data to touch system 101, representing various elements (indicating for example, the shape, color, dimension, location), to facilitate such interaction. Tooltip information corresponding to such elements may also be sent as a part of such data. Server system 103 may be implemented (and corresponding web pages received), for example, as described in the co-pending application entitled, "Displaying Interactive Charts On Devices With Limited Resources", noted above. The interactivity described in that co-pending application may be provided in combination with at least some of the features described herein.

Touch system 101 provides user interfaces based on touch screens. Touch system 101 may implement either stand-alone applications or networked applications (i.e., as a client side complementing the server side implementation on server system 103). The networked applications can be a web browser (with appropriate plug-ins) or a custom application such as a mobile application. Touch system 101 may for example correspond to a personal digital assistant (PDA), a mobile phone, etc. A user is shown performing a touch operation on touch screen 110 using finger 120. As noted above, touch operations can be performed using one or more fingers, stylus, etc.

Touch screen 110 displays a composite image of various received elements. An element is represented by a portion of a display, visually identifiable as a separate entity in its display context. Examples of elements include various graphical icons, interface elements (buttons, scrollbars, etc.), etc, normally generated by the operation of various user applications (e.g., word processors, spread sheets, custom business applications, etc.) or shared utilities (e.g., operating system).

It may be desirable to provide tooltips associated with various displayed elements. In an embodiment, a user has been expected to 'touch/tap' the precise element of interest to view corresponding tooltip. Alternatively, the user can swipe on the displayed elements to view corresponding tooltip information. Both approaches are frustrating to users in case of densely populated display areas and/or thick fingers.

Aspects of the present disclosure overcome at least some of the problems/requirements noted above, as described below with examples.

3. Displaying Tooltips to Users of Touch Screens

Figure 1B:
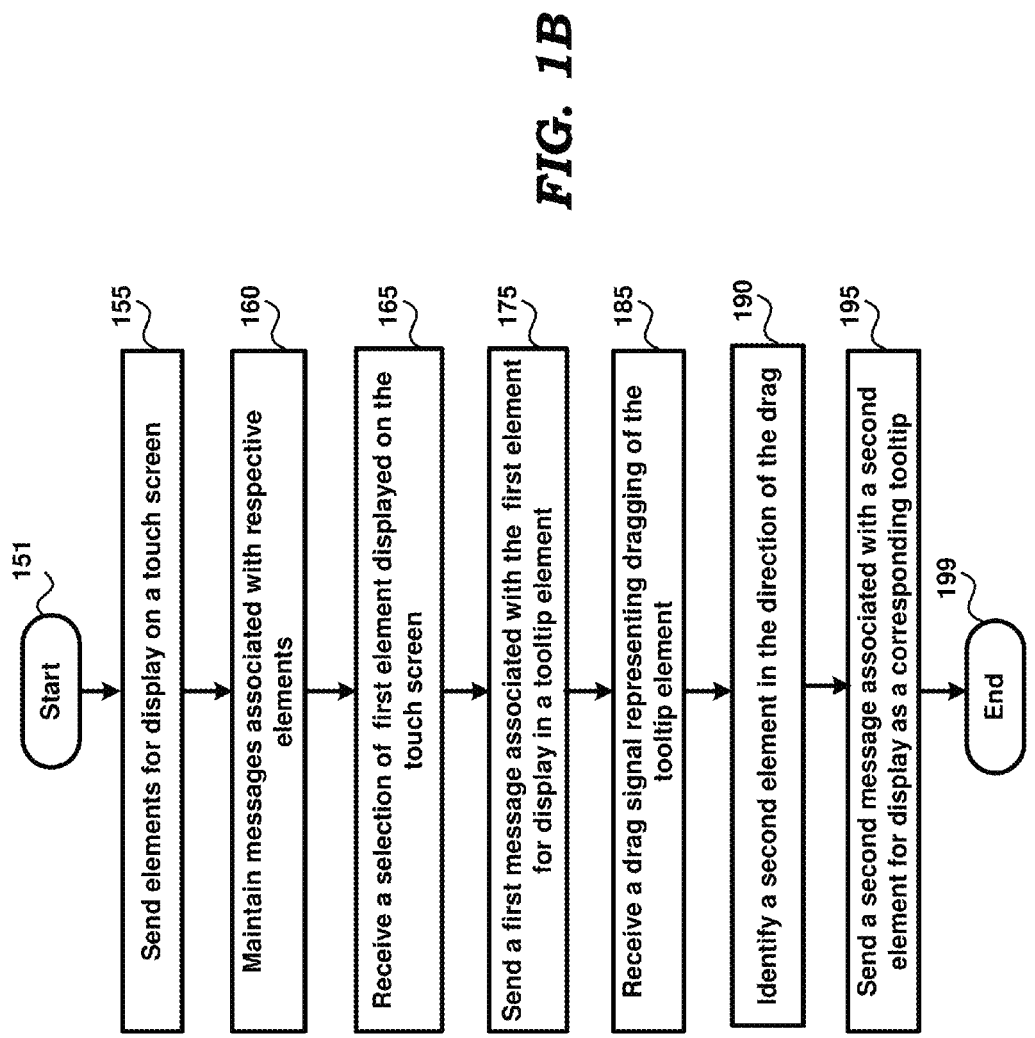
FIG. 1B is a flowchart illustrating the manner in which tooltips are displayed according to an aspect of the present disclosure.

FIG. 1B is a flowchart depicting the manner in which tooltips are displayed on touch screens according to an aspect of the present disclosure. The flowchart is described with respect to touch system 101 of FIG. 1. However, the features can be implemented in other touch-based systems and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 151, in which control immediately passes to step 155.

In step 155, touch system 101 sends elements for display on a touch screen 110. Each element may be defined (in the data sent) by a corresponding area (shape, size, location, etc.) to be occupied on the display screen and various attributes of each element.

In step 160, touch system 101 maintains messages associated with respective elements. That is, at least for some of the elements sent in step 155, touch system 101 may maintain a corresponding message associated with the respective one of the elements. The messages (and association information) may be stored in a memory according to any suitable convention.

In step 165, touch system 101 receives (data indicating) selection of a first element displayed on the touch screen. As may be appreciated, the elements of step 155 are displayed on touch screen 110 and a user may use an appropriate user interface (e.g., touch or a click operation using a pointer device) to select any desired element. The selected element is received as the first element of step 165.

In step 175, touch system 101 sends a first message associated with the first element for display in a tooltip element. The association implies that the resulting immediate display would intuitively convey to the user that the first message is a tooltip for the first element.

In step 185, touch system 101 receives a drag signal representing dragging of the tooltip element in a direction. Dragging implies a continuous touch, while 'pulling or pushing' the tooltip element in a desired direction. The hardware and software associated with the touch screen provides data values consistent with pre-determined conventions, indicating such a drag operation of the tooltip element.

In step 190, touch system 101 identifies a second element in the direction of the drag. Any convention can be used in identifying the element in the direction of the drag. The manner of identification in some example contexts are described in the co-pending related applications noted above.

In step 195, touch system 101 sends a second message associated with the second element for display as a corresponding tooltip. The second message is identified based on the information maintained in step 160, and thereafter sent for display as a tooltip. Thus, by simply dragging the displayed tooltip, the user may receive the tooltip information for the next element of interest.

Though illustrated with a single instance of the drag operation in FIG. 2, the user may drag the tooltip onto or towards various elements of interest, and have the tooltip information updated corresponding to each element in the path. The flowchart ends in step 199.

The above described features of FIG. 2 can be implemented in combination with various other features. In an embodiment, the display of the first message is persisted in the tooltip in the duration between the selection of the first element and start of the dragging (of step 185) even if there is no touch on the touch screen in the duration. In other words, even if a user lifts the stylus (or finger) which was the basis of the selection/touch of step 165, the tooltip information is persisted (continued to be displayed) until the drag operation.

The above noted approaches and some other features of the present disclosure are illustrated below with respect to various examples.

4. Examples

Figure 2A:
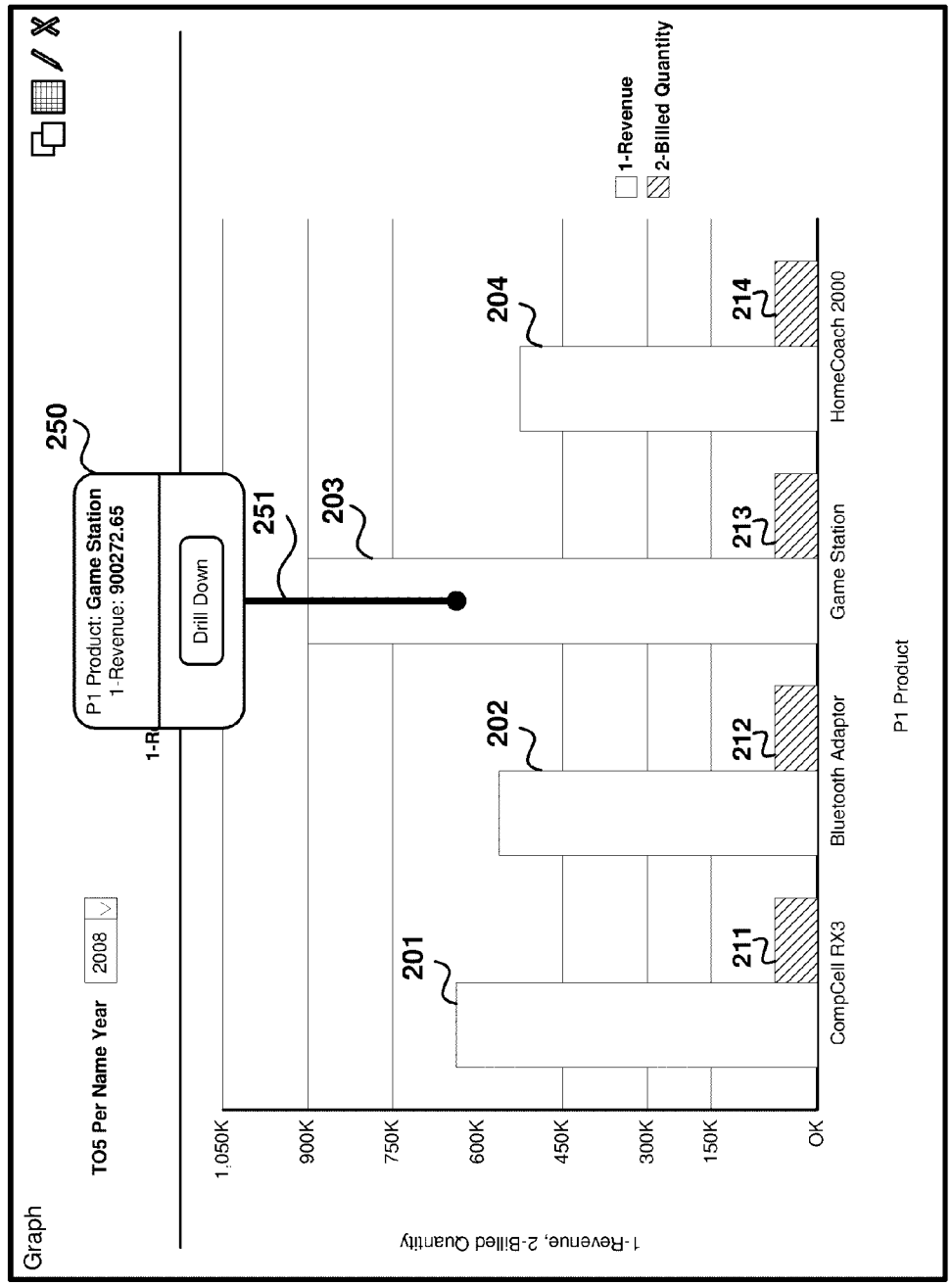
FIGS. 2A-2E represent respective displays on a touch screen illustrating the selection and display of tooltip information
Figure 2B:
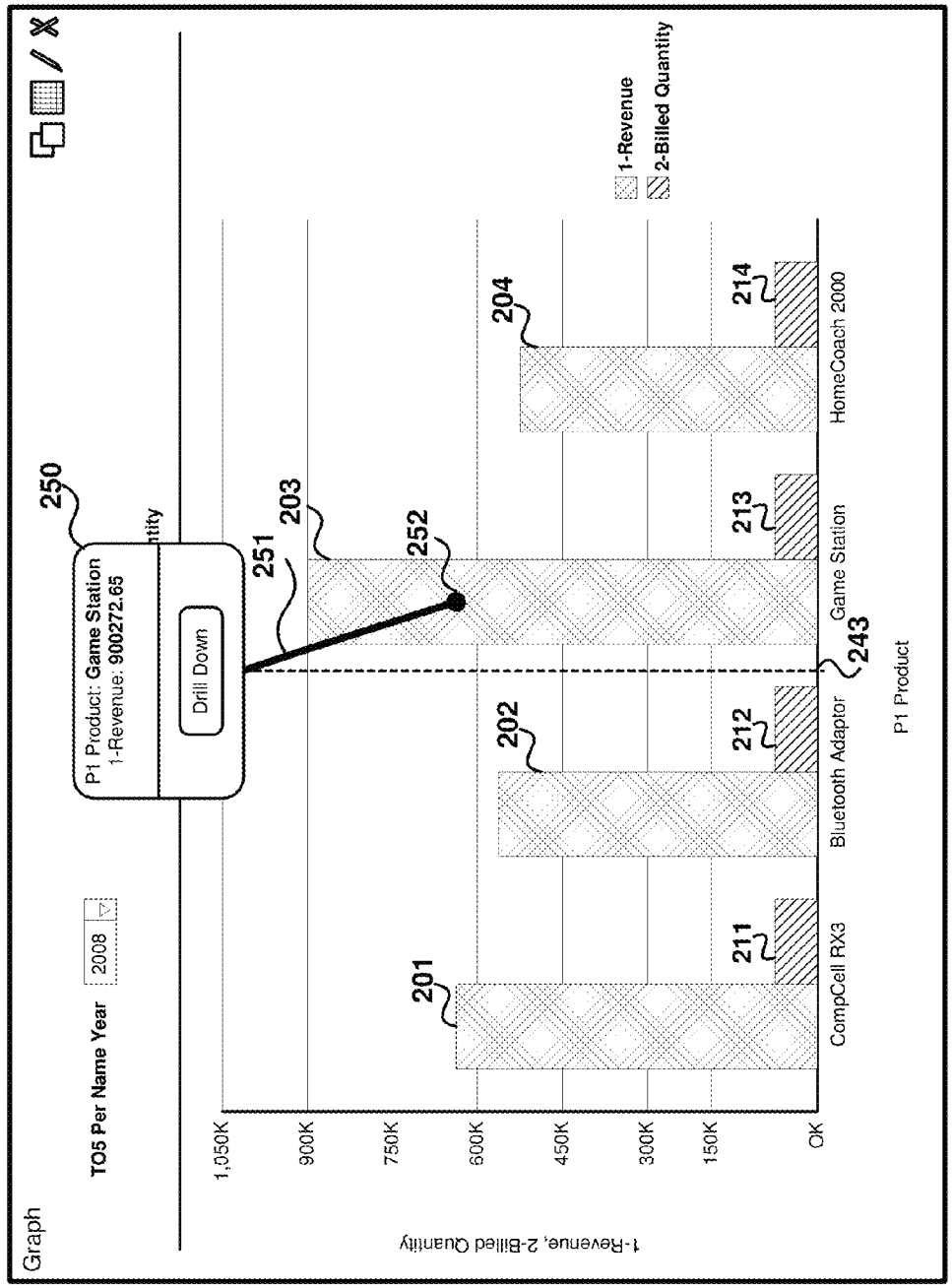
Figure 2C:
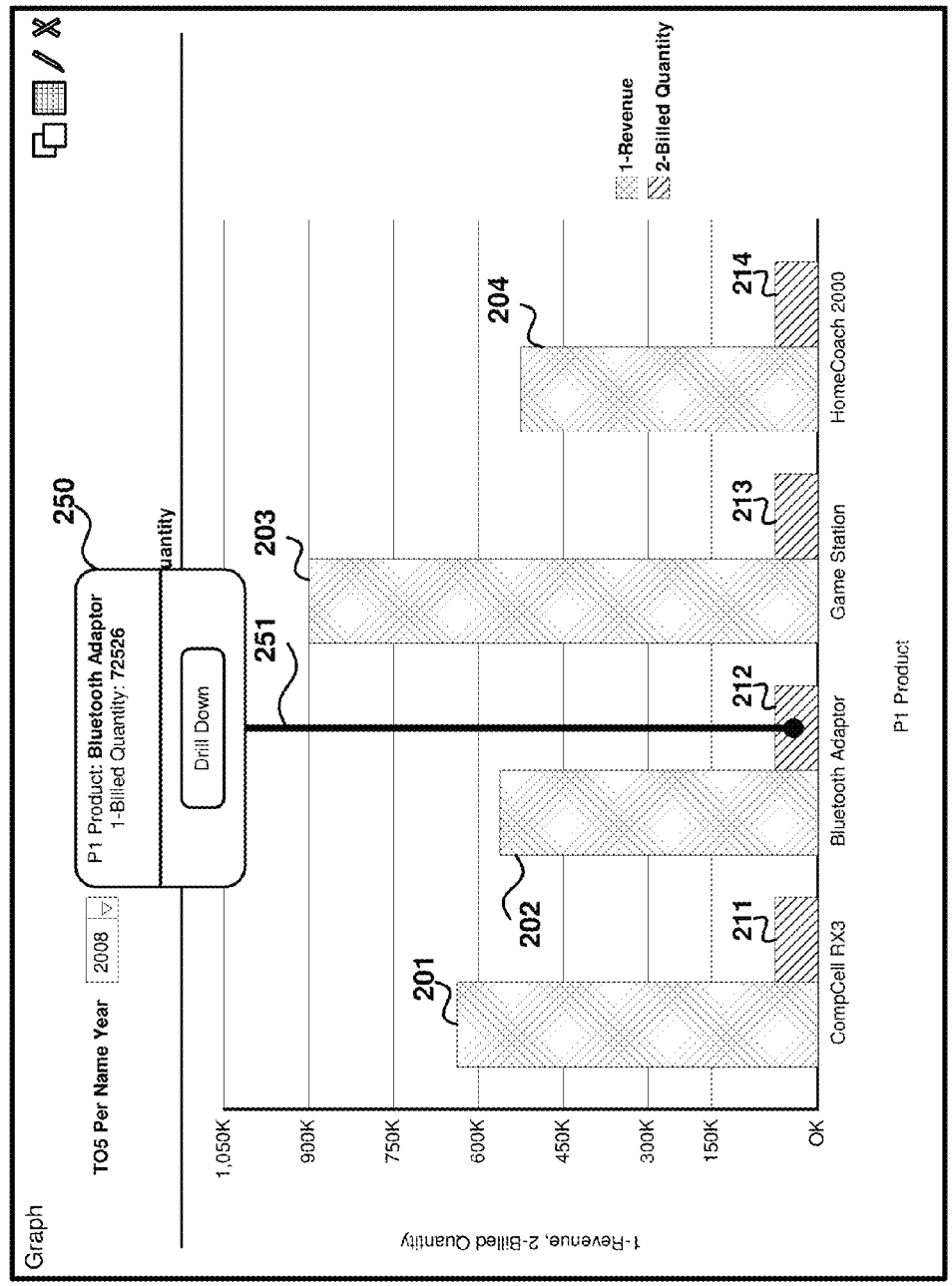

FIGS. 2A-2E represents displays on touch screen 110 at respective time instances, and illustrates some of the features of the present disclosure, as described below. In particular, each of FIGS. 2A-2C depicts elements 201-204 and 211-214 with a tooltip element. The tooltip element is shown containing tooltip box 250 and leader line 251, though other forms of elements may be employed as tooltip elements. Leader line 251 is shown pointing to the selected element at the corresponding time instance.

FIG. 2A depicts the display after a user has selected 'Game Station—Revenue' element 203. The element is selected upon a user touching/tapping an area of display associated with that element. Leader line 251 of the tooltip element is shown pointing to the selected element 203. The associated area is normally specified programmatically, and for the convenience of the users, normally spans some or all of the area spanned by the element in the display.

According to an aspect of the present disclosure the tooltip element continues to persist (i.e., does not disappear) even if there is no continued touch of the selected element on the touch screen 110. Thus, assuming the user lifts his/her finger from touch screen 110 after the selection operative in FIG. 2A, the display there continues. Such a feature offers the convenience of the user being able to drag the tooltip element, as described below.

Once an element is selected and tooltip tool is displayed as shown in FIG. 2A, the user can thereafter touch/tap the tooltip element and drag the tooltip element (normally using the tooltip box 250) to cause a next desired element to be selected, and corresponding tooltip displayed. Dragging implies that the user continues to keep touch/finger on the tooltip element (conveniently box 250), while sliding the finger in the desired direction on the touch screen.

The user can drag the tooltip element in any direction and the leader line 251 accordingly moves as well. As the leader line 251 touches or crosses a next element, such next element is treated as the selected element. The information corresponding to that next element is then updated in the tooltip element.

Thus, assuming the user of FIG. 2A has dragged the tooltip element to the left, the display on touch screen 110 is changed to as that shown in FIG. 2C. As shown there, the tooltip information is shown updated corresponding to the selected element 'Bluetooth Adaptor—Billed Quantity' 212.

FIG. 2B depicts the user experience as the user drags the tooltip box 250 from the position shown in FIG. 2A to that in FIG. 2C. The farther tip 252 of tooltip element is shown maintained on element 203 in the duration between FIGS. 2A and 2C. The specific time instance at which to transition to FIG. 2C from FIG. 2B may be determined based on the position of hypothetical point 243, which represents a projection of the closer/other end of leader line 251 to the X-axis. When point 243 touches element 212 (or intersects with projection of the element to X-axis, as shown, element 212 may be deemed to be selected. However alternative considerations (e.g., when point 243 reaches the centre of element 212, or when point 243 is closer to element 212 than 203) may be employed in the determination of selection of the next element during a drag operation. Some of such approaches are described in the co-pending patent applications noted above. In addition, farther tip 252 may also be moved when the tooltip element is dragged, instead of being connected to previously connected element 203, as depicted in FIG. 2B.

Figure 2D:
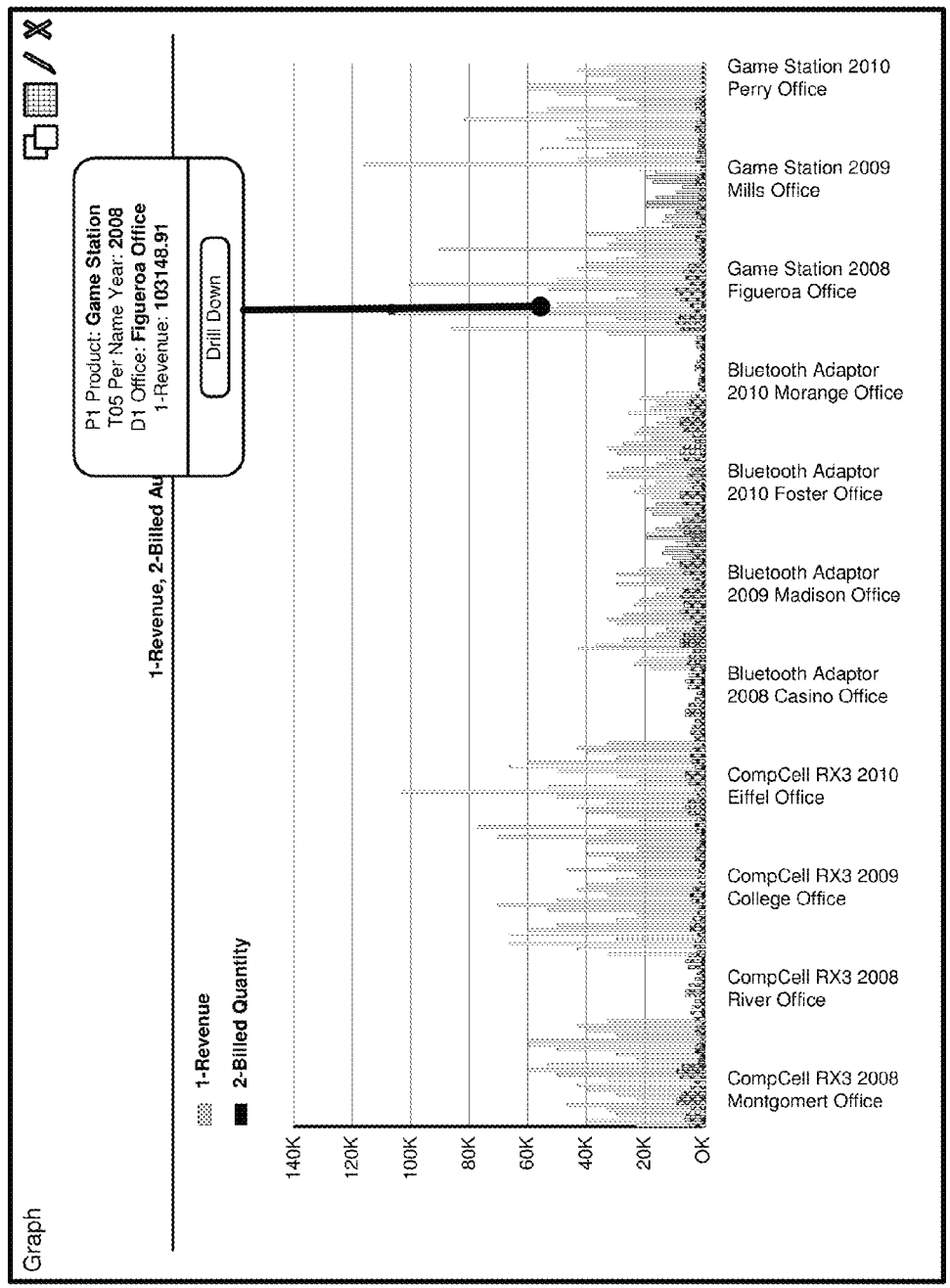
Figure 2E:
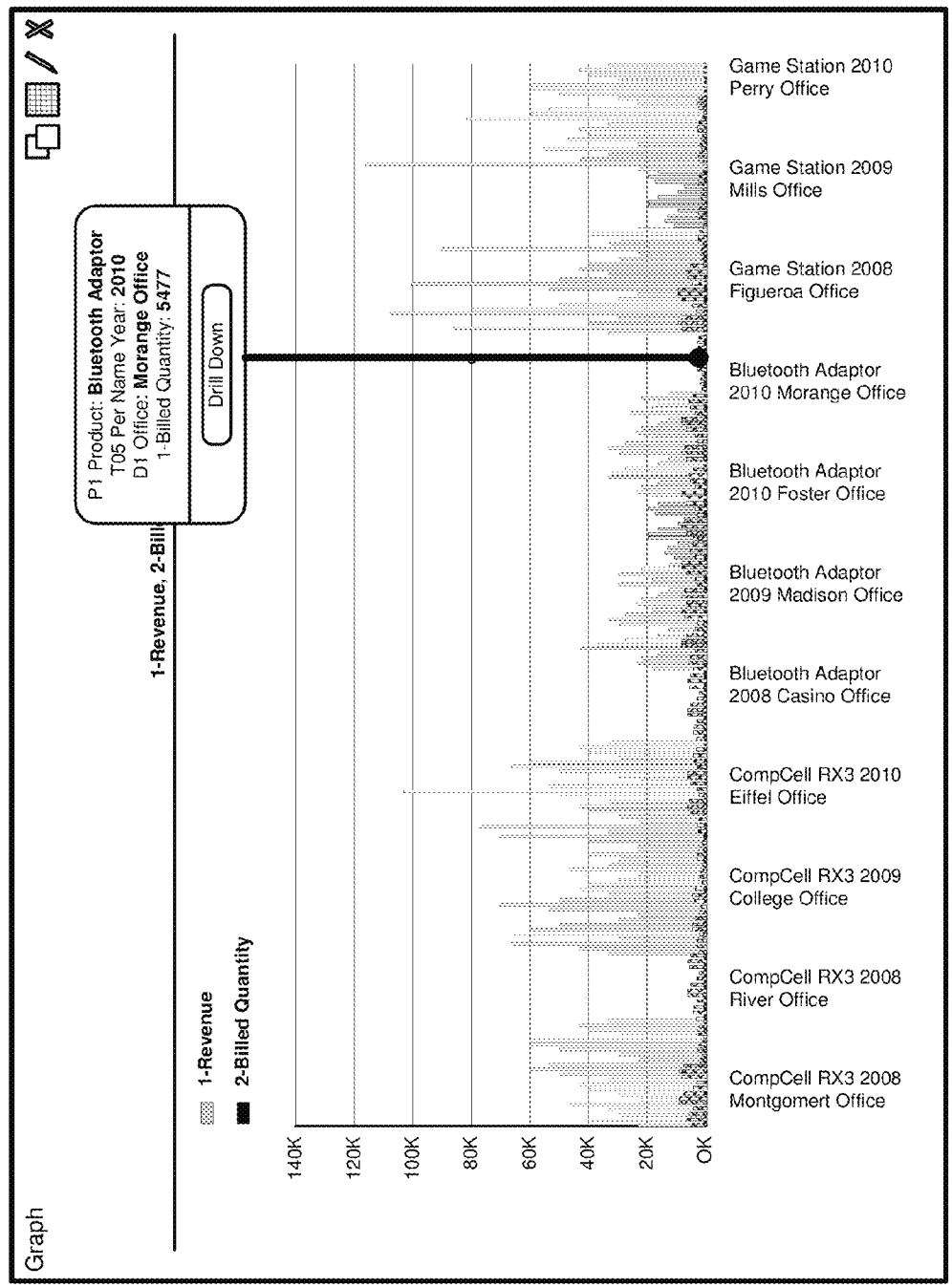

The selection of various displayed elements and the display of corresponding tooltip information is further illustrated with respect to FIGS. 2D and 2E. The display there contains densely populated elements. Elements being densely populated implies that the extent of area in contact by a normal touch operation (e.g., with finger tip) can cover multiple displayed elements, as can be visually discerned in FIGS. 2D and 2E.

It may accordingly be challenging to select the specific vertical bar (element) of interest in view of the small area occupied by each element. The user is shown having selected an element (revenue for—P1 Product: Game Station, T05 Per Name Year: 2008, D1 Office: Figueroa Office) in FIG. 2D and dragged to the left to select a later element (Billed Quantity for Product: Bluetooth Adaptor, T05 Per Name Year: 2010, D1 Office: Morange Office).

It should be appreciated at any point when an element is selected and the corresponding tooltip information is displayed, a user may lift his finger/stylus to cease touching, and the display is persisted with the tooltip information (including box and leader line). However, the tooltip element can be dragged to view elements in a corresponding direction.

From the above, it may be appreciated that the user can be assured of reaching a desired element of interest at least gradually. In particular, the user may select one of the displayed elements (potentially, just close to the desired one), and then navigate towards the precise element of interest.

Furthermore, the tooltip box 250 is shown updated with the tooltip information of each selected element, thereby providing a convenient mechanism to view related information of successive elements.

In addition, the tooltip box 250 is shown with a 'Drill Down' button, which may be selected to obtain more detailed information for the selected element. Such a feature and additional interactivity features are described in one or more of the co-pending patent applications noted above.

The description is continued with respect to the manner in which touch system 101 can be implemented in several embodiments.

5. Touch System

Figure 3:
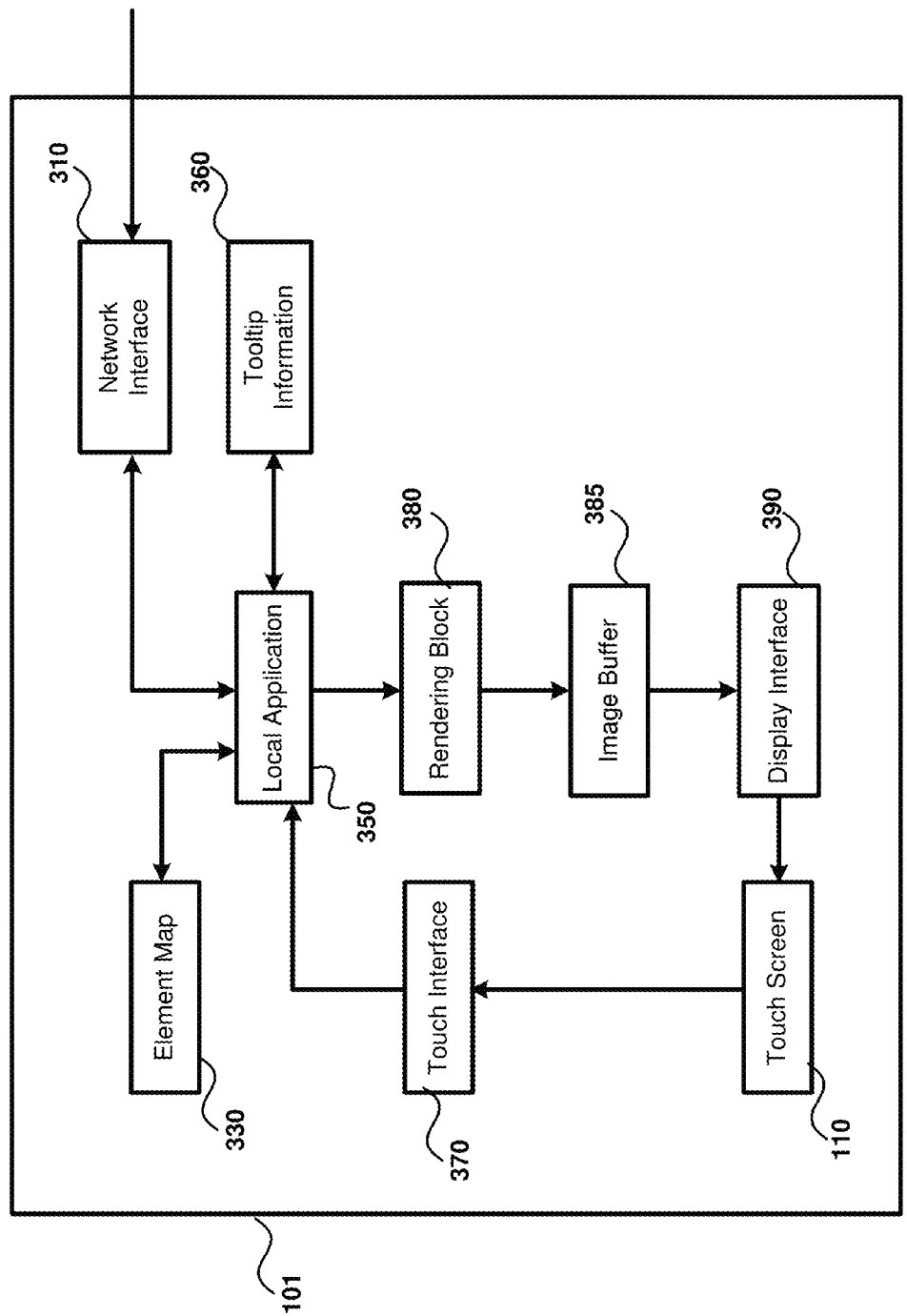
FIG. 3 is a block diagram illustrating the details of a digital processing system in an embodiment.

FIG. 3 is a block diagram illustrating the details of touch system 101 in an embodiment. Touch system 101 is shown containing network interface 310, local application 350, tooltip information 360, touch interface 370, rendering block 380, image buffer 385, and display interface 390.

Network interface 310 provides the connectivity with server system 103 to receive data representing various elements and any corresponding tooltip information (for networked applications). The received data is provided to local application 350. In case of stand-alone application such information may be integral to the application being executed.

Touch interface 370 provides information characterizing various touch operations on touch screen 110. For example, the received data may indicate whether a single point was touched, multiple were touched simultaneously, and the coordinates (e.g., a centre point of the touch) of such one or more touches. The data thus received forms the basis for determining whether a user has intended a single touch/tap, drag, pinch, etc., touch operations on touch screen 110.

Element map 330 represents the various elements that are displayed on touch screen 110, and the corresponding locations/area covered by the element. Each element may be identified by a corresponding data point. For example, FIG. 2A is shown containing 8 elements, corresponding to eight data points (Revenue and Billed quantity for each CompCell RX3, Bluetooth Adapter, Game Station, and Home Coach). Tooltip information 360 contains the respective text/information (messages of step 160) to be provided associated with any/each element that is received from server system 103.

Rendering block 380 may receive the list of elements to be displayed (e.g., characterized by shape and relevant attributes to define the complete image for the element), the corresponding area that each element is to cover on the display screen, etc., and generate a composite image of all the elements. The composite image (e.g., in RGB format) is stored in image buffer 385. Display interface 390 generates display signals which cause the corresponding image to be displayed on touch screen 110. Touch interface 370, rendering block 380, image buffer 385, display interface 390 and touch screen 110 may be implemented in a known way.

Local application 350 represents a client side portion of a networked application (e.g., browser) or a stand-alone application. In case of standalone application, the elements and corresponding information may be formed/created locally upon execution of the corresponding instructions. In case of networked applications, data corresponding to various elements is received from server system 103 via network interface 310. Local application 350 processes the data and populates element map and tooltip information 360 based on the received information.

Based on the elements populated in element map 330, local application 350 then sends a list of elements to rendering block 380, which causes the corresponding display to be generated on touch screen 110 based on the operation of image buffer 385 and display interface 390 described above. At such a first instance upon receipt of the elements on network interface 310, the display may correspond to that shown in FIGS. 2A and 2D, but without the leader line and tooltip. The leader line 251 and tooltip 250 are added upon selection of corresponding element, as described below.

Upon receiving indication of a touch operation (e.g., with the centre of the touch operation received as a parameter value), local application 350 first determines the specific one of the elements in element map 330, which is deemed to be selected. An element which has been sent for display on an area covering the touch point (or the centre received as a parameter) may be deemed to be the selected element.

Local application 350 forms another element (or elements) representing the leader line 251 and tooltip box 250. The tooltip message corresponding to the selected element is retrieved from tooltip information 360, and incorporated into the tooltip box 250. The leader line 251 is defined to point to the element selected by the user. The list of elements in element map 330 along with the newly formed leader line 251 and tooltip box 250 elements are sent for display. The display now corresponds to that in each of FIGS. 2A and 2D. Local application 350 may maintain a local data (for example, in a volatile memory) indicating the details of the selected element (such as, the index of the element in element map 330) and thereafter update the local data based on the subsequent touch operations.

Now assuming that the touch operation maps to dragging of the tooltip box 250 (or leader line) in a specific direction, a next element in that direction is selected by examination of element map 330. In an embodiment, the element covered by the leader line 251 is deemed to be selected. Until such next element is selected, the tooltip information in the tooltip box is left unchanged (as shown in FIG. 2A/2D), while the leader line 251 and tooltip box 250 are continued to be moved corresponding to the drag operation. Both element map and display on touch screen 110 may be updated to reflect the successive movements providing a view of the constant movement.

Once a new/next element is selected, local application 350 retrieves the tooltip information corresponding to the selected element from tooltip information 360, and incorporates the retrieved information into the tooltip box. Element map 330 and consequently image buffer 385 are updated corresponding. As a result, the local data and display on touch screen 110 are updated to correspond to FIG. 2B in case of earlier display of FIG. 2A, and to FIG. 2E in case of earlier display of FIG. 2D. The leader line 251 is pointed to the new selected element as shown.

Thus, the user may be permitted to drag the tooltip box 250 in the direction of a next interested element, while the tooltip information in the tooltip box 250 is updated once a new element is deemed to be selected. In particular, a user may drag the tooltip covering a sequence of elements, and the tooltip display is updated with the message corresponding to the next selected element. The message may be persisted until a subsequent element in the sequence is deemed to be selected, as the user continues the dragging (to later elements in the sequence).

It should be further appreciated that the features described above can be implemented in various embodiments as a desired combination of one or more of hardware, software, and firmware. The description is continued with respect to an embodiment in which various features are operative when the software instructions described above are executed.

6. Digital Processing System

Figure 4:
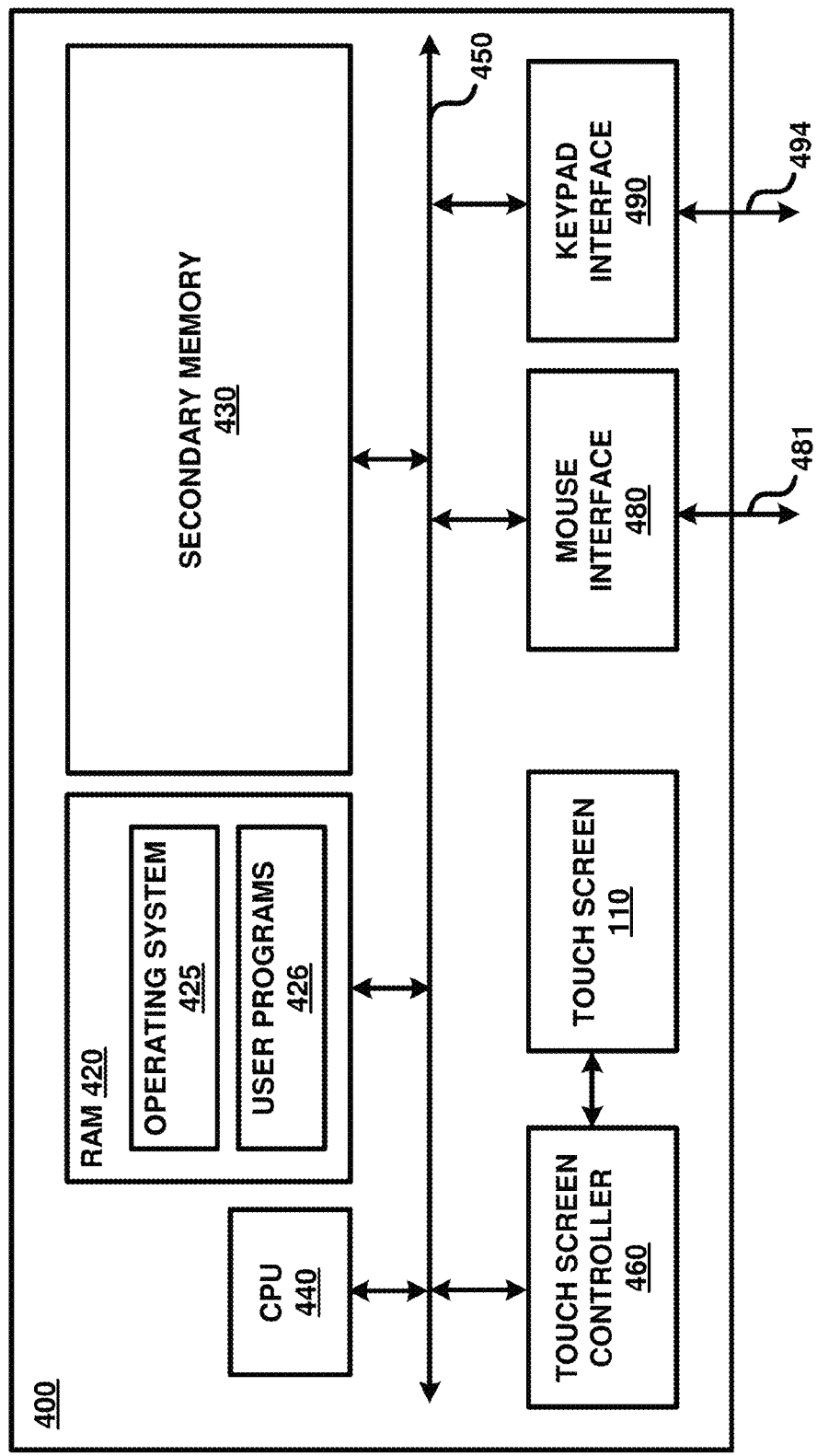
FIG. 4 is a block diagram illustrating the details of a digital processing system in which various aspects of the present disclosure are operative by execution of appropriate software instructions.

FIG. 4 is a block diagram illustrating the details of an example special purpose computing system in which several aspects of the present disclosure can be implemented. Special purpose computing system (System) 400 (corresponding to touch system 101) is shown containing central processing unit (CPU) 440, random access memory (RAM) 420, secondary memory 430, touch screen controller 460, touch screen 110, mouse interface 480 and keypad interface 490. All the components except touch screen 110 may communicate with each other over communication path 450, which may contain several buses as is well known in the relevant arts.

CPU 440 may execute instructions stored in RAM 420 to provide various features of system 400. Thus, for example, when system 400 corresponds to a PDA, the operation of CPU 440 may enable a user to use one or more of many user applications stored in the PDA and executable by CPU 440. The applications may include, for example, word processors, web browsers, email client, data organizers such as address books, etc. CPU 440 may contain multiple processors, with each processor potentially being designed for a specific task. Alternatively, CPU 440 may contain only a single general-purpose processor. Such combination of one or more processors may be referred to as a processing unit.

RAM 420 may receive instructions from secondary memory 430 using communication path 450. RAM 420 is shown currently containing software instructions constituting shared environment 425 and user programs 426. Shared environment 425 contains utilities shared by user programs 426, and such shared utilities include operating system, device drivers, etc., which provide a (common) run-time environment for execution of user programs/applications. User programs 426 may include applications such as word processing, email client, etc., (or local application 350, including storing of element map 330 and tooltip information 360) noted above. One or more of user programs 426 may be designed to interact with a user via a graphical user interface (GUI) presented on touch screen 110, described above with respect to FIGS. 2A-2E.

Secondary memory 430 represents a non-transitory machine readable storage medium, and may store data and software instructions (for example, for performing the steps of the flowchart of FIG. 1B, described below), which enables system 400 to provide several features in accordance with the present disclosure. Further, secondary memory 430 may store data representing the tooltip information, the information displayed in FIGS. 2A-2D, etc. The code/instructions stored in secondary memory 430 may either be copied to RAM 420 prior to execution by CPU 440 for higher execution speeds, or may be directly executed by CPU 440.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as secondary memory 430. Volatile media includes dynamic memory, such as RAM 420. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 450. Transmission media can also take the form of acoustic or light waves, such as those generated during radio-wave and infra-red data communications.

Mouse interface 480 enables user-inputs to be provided to system 400 via a mouse (not shown) connected on path 481. Keypad interface 490 is connected to a keypad (not shown) via path 494, and enables user-inputs to be provided to system 400 via a keypad.

Touch screen controller 460 generates display signals (e.g., in RGB format) to cause corresponding text or images (for example, in the form of a GUI) to be displayed on touch screen 110. Touch screen controller 460 receives touch signals generated by touch screen 110, in response to touch/pressure (in general, the touch operations) applied on touch screen 110. Touch screen controller 460 may process such touch signals and generate digital data representing the touch signals.

The generated digital data is passed to appropriate execution entities via the shared environment (operating system) 425. For example, if a touch operation is performed with respect to a visual element controlled by a user application, the digital data is eventually delivered to the user application.

Touch screen 110 displays text/images, etc, defined by the display signals received from touch screen controller 460. Thus, touch screen 110 may display a GUI generated by an application executed by CPU 410. Touch screen 110 generates touch signals in response to touch operations using finger(s) or stylus, etc., with respect to a corresponding portion (for example a visual element) of touch screen 110. Touch screen controller 460 and touch screen 110 may be implemented in a known way.

In this document, the term "computer program product" is used to generally refer to a removable storage unit or hard disk installed in a hard drive. These computer program products are means for providing software to digital processing system 400. CPU 410 may retrieve the software instructions, and execute the instructions to provide various features of the present disclosure described above.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

7. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

I claim:

1. A method of displaying tooltips to a user of a touch screen, said method comprising:
    sending a plurality of elements for display on said touch screen;
    maintaining a plurality of messages, each of said plurality of messages being associated with a respective element of said plurality of elements;
    receiving a selection of a first element of said plurality of elements displayed on said touch screen, wherein said first element is indicated as a current element selected by said user in response to said selection;
    sending a first message for display in a tooltip element on said touch screen, wherein said tooltip element contains a tooltip box and a sub-element, said first message being associated with said first element and is shown displayed in said tooltip box, said sub-element set to point to said current element selected by said user such that said sub-element points to said first element as said current element in response to said selection;
    receiving a drag signal representing dragging of said tooltip element in a direction on said touch screen, wherein said drag signal indicates dragging of said tooltip box to represent dragging of said tooltip element;
    determining a second element of said plurality of elements in said direction, wherein said second element is determined based on characteristics of dragging of said tooltip box; and
    sending a second message for display in said tooltip element, said second message being associated with said second element and is shown displayed in said tooltip box, wherein said sub-element of said tooltip element is updated to point to said second element as said current element upon said determining of said second element as a response to said drag signal.

2. The method of claim 1, further comprising persisting said display of said tooltip element, including said first message, in a duration between said selection of said first element and start of said dragging even if there is no touch on said touch screen in said duration.

3. The method of claim 2, further comprising receiving signals indicating that said tooltip box is dragged covering a sequence of elements in said direction, said sequence of elements being contained in said plurality of elements, wherein the message associated with each successive element of said sequence of elements is displayed in said tooltip box in response to said tooltip box covering the corresponding element.

4. The method of claim 1, wherein said second element is the next element in said direction relative to said first element, having said second message as said associated message for display in said tooltip box.

5. The method of claim 1, wherein said characteristics comprise one or more of direction, distance and speed of dragging, wherein said sub-element is a leader line having a first end and a second end, wherein said first end is displayed connected to said tooltip box and said second end is displayed connected to said current element.

6. The method of claim 5, wherein said plurality of elements are displayed distributed along a single axis of a graph, wherein said leader line is a straight line from said tooltip box to said current element, and said tooltip box is substantially in the form of a rectangle with curves at four corners.

7. A non-transitory machine readable medium storing one or more sequences of instructions for causing a touch system to facilitate selection of elements displayed on a touch screen contained in said touch system, wherein execution of said one or more sequences of instructions by one or more processors contained in said touch system causes said touch system to perform the actions of:

sending a plurality of elements for display on said touch screen;

maintaining a plurality of messages, each of said plurality of messages being associated with a respective element of said plurality of elements;

receiving a selection of a first element of said plurality of elements displayed on said touch screen, wherein said first element is indicated as a current element selected by said user in response to said selection;

sending a first message for display in a tooltip element on said touch screen, wherein said tooltip element contains a tooltip box and a sub-element, said first message being associated with said first element and is shown displayed in said tooltip box, said sub-element set to point to said current element selected by said user such that said sub-element points to said first element as said current element in response to said selection;

receiving a drag signal representing dragging of said tooltip element in a direction on said touch screen, wherein said drag signal indicates dragging of said tooltip box to represent dragging of said tooltip element;

determining a second element of said plurality of elements in said direction, wherein said second element is determined based on characteristics of dragging of said tooltip box; and sending a second message for display in said tooltip element, said second message being associated with said second element and is shown displayed in said tooltip box, wherein said sub-element of said tooltip element is updated to point to said second element as said current element upon said determining of said second element as a response to said drag signal.

8. The machine readable medium of claim 7, further comprising persisting said display of said tooltip element, including said first message, in a duration between said selection of said first element and start of said dragging even if there is no touch on said touch screen in said duration.

9. The machine readable medium of claim 8, further comprising receiving signals indicating that said tooltip box is dragged covering a sequence of elements in said direction, said sequence of elements being contained in said plurality of elements, wherein the message associated with each successive element of said sequence of elements is displayed in said tooltip box in response to said tooltip box covering the corresponding element.

10. The machine readable medium of claim 7, wherein said second element is the next element in said direction relative to said first element, having said second message as said associated message for display in said tooltip box.

11. The non-transitory machine readable medium of claim 7, wherein said characteristics comprise one or more of direction, distance and speed of dragging, wherein said sub-element is a leader line having a first end and a second end, wherein said first end is displayed connected to said tooltip box and said second end is displayed connected to said current element.

12. The non-transitory machine readable medium of claim 11, wherein said plurality of elements are displayed distributed along a single axis of a graph, wherein said leader line is a straight line from said tooltip box to said current element, and said tooltip box is substantially in the form of a rectangle with curves at four corners.

13. A digital processing system comprising:

a touch screen;

a memory to store instructions;

a processing unit to retrieve instructions from said memory and execute the retrieved instructions, wherein execution of said retrieved instructions causes said digital processing system to perform the actions of:

sending a plurality of elements for display on said touch screen;

maintaining a plurality of messages, each of said plurality of messages being associated with a respective element of said plurality of elements;

receiving a selection of a first element of said plurality of elements displayed on said touch screen, wherein said first element is indicated as a current element selected by said user in response to said selection;

sending a first message for display in a tooltip element on said touch screen, wherein said tooltip element contains a tooltip box and a sub-element, said first message being associated with said first element and is shown displayed in said tooltip box, said sub-element set to point to said current element selected by said user such that said sub-element points to said first element as said current element in response to said selection;

receiving a drag signal representing dragging of said tooltip element in a direction on said touch screen, wherein said drag signal indicates dragging of said tooltip box to represent dragging of said tooltip element;

determining a second element of said plurality of elements in said direction, wherein said second element is determined based on characteristics of dragging of said tooltip box; and sending a second message for display in said tooltip element, said second message being associated with said second element and is shown displayed in said tooltip box, wherein said sub-element of said tooltip element is updated to point to said second element as said current element upon said determining of said second element as a response to said drag signal.

14. The digital processing system of claim 13, further comprising persisting said display of said tooltip element, including said first message, in a duration between said selection of said first element and start of said dragging even if there is no touch on said touch screen in said duration.

15. The digital processing system of claim 14, further comprising receiving signals indicating that said tooltip box is dragged covering a sequence of elements in said direction, said sequence of elements being contained in said plurality of elements,
   wherein the message associated with each successive element of said sequence of elements is displayed in said tooltip box in response to said tooltip box covering the corresponding element.

16. The digital processing system of claim 13, wherein said second element is the next element in said direction relative to said first element, having said second message as said associated message for display as in said tooltip box.

17. The digital processing system of claim 13, wherein said characteristics comprise one or more of direction, distance and speed of dragging,
   wherein said sub-element is a leader line having a first end and a second end, wherein said first end is displayed connected to said tooltip box and said second end is displayed connected to said current element,
   wherein said plurality of elements are displayed distributed along a single axis of a graph, wherein said leader line is a straight line from said tooltip box to said current element, and said tooltip box is substantially in the form of a rectangle with curves at four corners.

* * * * *

UNITED STATES PATENT AND TRADEMARK OFFICE
CERTIFICATE OF CORRECTION

| | |
|---|---|
| PATENT NO. | : 9,495,063 B2 |
| APPLICATION NO. | : 14/097259 |
| DATED | : November 15, 2016 |
| INVENTOR(S) | : Kapahi |

It is certified that error appears in the above-identified patent and that said Letters Patent is hereby corrected as shown below:

In the Specification

In Column 1, Line 13, below "RELATED APPLICATIONS" insert -- The instant patent application is related to the following patent applications, which are all herewith incorporated in their entirety to the extent not inconsistent with the disclosure of the instant patent application. --, as a new paragraph.

In Column 1, Line 17, delete "2013,First" and insert -- 2013, First --, therefor.

In Column 1, Line 20, delete "2013,First" and insert -- 2013, First --, therefor.

In Column 1, Line 24, delete "2013,First" and insert -- 2013, First --, therefor.

In Column 1, Line 28, delete "2013,First" and insert -- 2013, First --, therefor.

In Column 1, Lines 60-61, after "information" insert -- . --.

In the Claims

In Column 13, Line 20, in Claim 16, after "display" delete "as".

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*